May 12, 1936. C. B. BACON 2,040,458
CULINARY IMPLEMENT
Filed Sept. 11, 1934
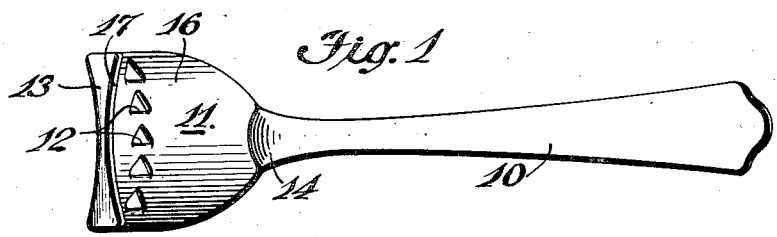
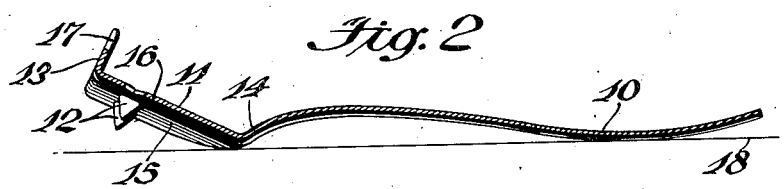
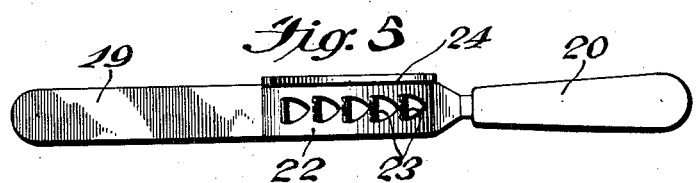
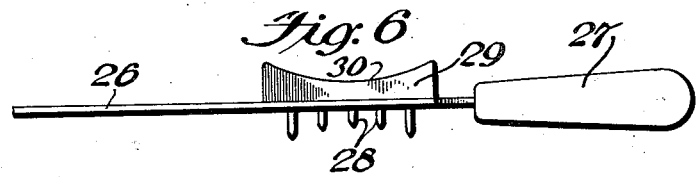
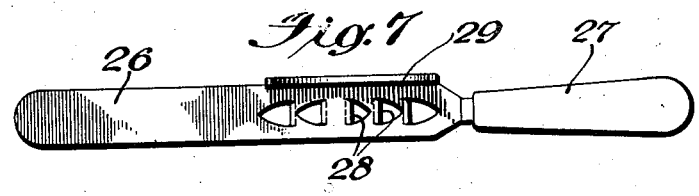
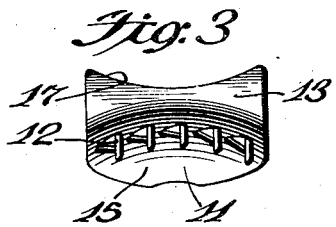
Inventor
Charls B. Bacon
By Raymond W Colton
Attorney Patented May 12, 1936

2,040,458

UNITED STATES PATENT OFFICE 2,040,458

CULINARY IMPLEMENT

Charls B. Bacon, Bridgeport, Conn.

Application September 11, 1934, Serial No. 743,607

5 Claims. (Cl. 146—4)

Maize, known more commonly in America as corn, is among our most wholesome and nutritious cereal foods. It contains water, protein, fat, carbohydrates and minerals, or in other words, all of the essential food elements.

Many persons are unable to partake of this food, particularly when it is served on the cob. Whereas the starches and the germ or embryo contained in an individual kernel are readily digestible, the surrounding layers of gluten and hull are believed to be responsible for the numerous cases of indigestion following the consumption of corn. One class of individuals is practically excluded from the enjoyment of this food, namely, those who suffer from gum ailments or have artificial teeth.

It is accordingly proposed to provide a culinary implement with the aid of which, the individual kernels of corn are split so that the easily digestible germ and starches may be consumed directly, leaving the less digestible portions clinging to the cob. The implement is further equipped for actually removing the digestible portions of the kernels so that the former may be eaten from a dish or be used in preparing other foods.

While the proposed construction is not the first to be suggested for the purpose, it constitutes a marked improvement over prior devices in that the disposition of its parts adds strength to the device as a whole, making possible a light yet rigid implement. The present structure may serve to split the corn grains and/or remove their contents, whereas some of the known devices serve merely the splitting function or perform both functions simultaneously. The manner of forming the sheet material from which the present device is constructed offers certain advantages which will become apparent after reading the accompanying description as directed to the attached drawing.

Fig. 1 is a plan of one form of the device;
Fig. 2 is a sectional elevation thereof;
Fig. 3 is an end view;
Fig. 4 shows a modification in elevation;
Fig. 5 is a plan of the modification;
Fig. 6 is an elevation of another modification; and
Fig. 7 is a plan of the modification shown in Fig. 6.

Referring more specifically to Figs. 1, 2, and 3, a sheet or plate of metal is shown as having a handle 10 which is joined to a body portion 11, the body portion being provided with a plurality of struck-up prongs or slitting elements 12 of substantially equal lengths and a terminal flange 13 extending oppositely to the prongs.

A curved section 14 is formed in the handle 10, adjacent to its junction with the body portion 11. The body portion itself, as shown in these figures, is essentially a section of a hollow cylinder, which may be termed convexo-concave in shape. The concave or lower surface 15 will conform more or less to the ear of corn for which the device is intended.

The prongs 12 are substantially triangular, and although their planes are shown as parallel, they may extend in planes normal to the concave surface or otherwise. These struck-up prongs may themselves be other than triangular and their edges may be sharpened if desired.

The flange 13 extending from the convex or upper surface 16, is shown as normal to the body portion, the flange terminating in a concave edge 17, also designed to conform to the ear of corn.

It will be seen that the struck-up prongs 12 and the flange 13 tend to strengthen the device, and consequently undesired bending will be avoided even with relatively thin sheet metal construction.

In operation, the user grasps the handle 10, placing a thumb or finger behind the curved section 14, and draws the body portion 11 over an ear of corn, the prongs 12 splitting the grains. If it is desired to express the germ and starches, the implement is turned to bring the flange 13 into contact with the corn, a thumb or finger then resting in the concave portion of the body portion, and again the cob is traversed.

The curved section 14 and the concave portion adjacent the handle junction, afford ready means for obtaining the required pressure for both positions of use of the implement.

As represented in Fig. 2, the implement when resting upon a horizontal plane 18, maintains the prongs out of contact with the plane, and thus prevents soiling of the table linen or other surface constituting the plane. This feature results from properly bending the handle with respect to the body portion and does not depend upon additional projections which would interfere with expeditious use of the device by unduly obstructing the operating surfaces.

The modification shown in Figs. 4 and 5, combines the functions already disclosed with those of a knife. The plate or body portion 19 is provided with a suitably attached or integral handle 20. Intermediate of the body portion and, for rigidity, preferably near the handle a curved portion is formed having a concave lower surface 21 and a convex upper surface 22. Projecting downwardly from the lower surface, there are a series of prongs 23, shown as parallel, which may be formed in any of the ways contemplated for the previous embodiment. Rising from the convex surface is a flange 24, coextensive with the curved portion, and terminating in a concave edge 25.

By virtue of the flange, undesired longitudinal bending of the blade is inhibited while the struck-up prongs 23 add strength in a transverse direction. The flange provides a bearing surface for the thumb or finger of the user when effecting either operation, that is, slitting the kernels or removing their contents.

The device shown in Figs. 6 and 7 resembles that of Figs. 4 and 5, differing primarily in the omission of the curved portion and the manner of formation of the prongs. Here the plate or body portion 26 is again shown as a knife blade having an attached or integral handle 27. In the former cases, the prongs were shown as having equal lengths, the curved configuration of their free edges being attributable to the concavity of their respective body portions.

The plate in this case has equally spaced prongs 28 of varying lengths, struck-up from one of its surfaces, their free edges again defining a curve for cooperation with an ear of corn. The central prong will have a relatively short length, the outer ones having progressively greater lengths.

Extending from the surface of the plate opposite to that bearing the prongs, a flange 29 is provided, which terminates in a concave edge 30, as in Fig. 4.

The embodiment of Figs. 1, 2, and 3 may be similarly modified to present a flat body portion with the prongs of various lengths defining a curved edge.

The devices proposed are preferably stamped, but it is within the scope of the present invention to form them in any manner, and instead of forming the slitting prongs from the unitary body, they may be separately formed and fastened to the body as by welding.

The scope of the invention is not to be restricted to methods of production nor to the specific embodiments depicted, except as defined in the appended claims.

I claim:

1. A culinary implement comprising a plate having a convex upper and a concave lower surface, a series of arcuately arranged prongs extending from said lower surface and a flange terminating in a concave edge extending from said upper surface.

2. A culinary implement comprising a plate having convex and concave surfaces, a series of prongs extending from said concave surface, the free edges of said prongs defining an arc which is substantially parallel to the plate surfaces, and a flange terminating in a concave edge extending from said convex surface.

3. A culinary implement comprising a plate having upper and lower surfaces, a flange terminating in a concave edge extending from the upper surface of and forming one terminus of said plate, a series of prongs extending from said lower surface, a handle forming a second terminus of and carried by said plate at such an angle with respect thereto that when the implement rests upon a horizontal plane, its downwardly projecting prongs are out of contact with the plane.

4. A culinary implement comprising a plate having upper and lower surfaces which are respectively convex and concave, a flange extending from said upper surface, said flange terminating in a concave edge and a series of prongs extending from said lower surface.

5. A culinary implement comprising a plate having convex and concave surfaces, a series of prongs projecting from said concave surface, said plate terminating at one end in a handle and at the opposite end in an angularly disposed flange extending from said convex surface and presenting a concave edge.

CHARLS B. BACON.